US012524638B1

(12) United States Patent
Perrichot et al.

(10) Patent No.: US 12,524,638 B1
(45) Date of Patent: Jan. 13, 2026

(54) ERASURE-BASED QUICK RESPONSE (QR) DECODING

(71) Applicant: QUALCOMM Incorporated, San Diego, CA (US)

(72) Inventors: Nicolas David Perrichot, Vienna (AT); Braulio Sespede, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/970,681

(22) Filed: Dec. 5, 2024

(51) Int. Cl.
| | |
|---|---|
| *G06K 7/14* | (2006.01) |
| *G06T 3/40* | (2024.01) |
| *G06T 5/20* | (2006.01) |
| *G06T 5/70* | (2024.01) |
| *G06V 10/60* | (2022.01) |

(52) U.S. Cl.
CPC ......... *G06K 7/1473* (2013.01); *G06K 7/1417* (2013.01); *G06T 3/40* (2013.01); *G06T 5/20* (2013.01); *G06T 5/70* (2024.01); *G06V 10/60* (2022.01); *G06T 2207/20084* (2013.01)

(58) Field of Classification Search
CPC .... G06K 7/1473; G06K 7/1417; G06V 10/60; G06T 5/70
USPC .................................................. 235/462.09
See application file for complete search history.

(56) References Cited

U.S. PATENT DOCUMENTS

| | | | | |
|---|---|---|---|---|
| 10,164,975 B1* | 12/2018 | Son | ................ | G06K 19/06103 |
| 10,198,648 B1* | 2/2019 | Bradley | ................ | G06V 10/42 |
| 10,225,265 B1* | 3/2019 | Sankuratripati | ...... | H04L 9/0838 |
| 11,995,505 B1* | 5/2024 | Vincent | ........... | G06K 19/06103 |
| 2006/0192011 A1* | 8/2006 | Madej | ................ | G06K 7/10544 |
| | | | | 235/462.27 |
| 2007/0272755 A1* | 11/2007 | Chang | ...................... | G06K 7/14 |
| | | | | 235/494 |
| 2009/0284802 A1* | 11/2009 | Yeap | ....................... | B41M 3/14 |
| | | | | 358/3.28 |
| 2012/0211567 A1* | 8/2012 | Herzig | .................... | G06F 17/00 |
| | | | | 235/488 |
| 2014/0291402 A1* | 10/2014 | Nakamura | ........... | G06K 7/1417 |
| | | | | 235/462.11 |
| 2015/0302236 A1* | 10/2015 | Aspert | ................. | G06K 7/1443 |
| | | | | 235/462.09 |
| 2023/0367983 A1* | 11/2023 | Zagaynov | ................ | G06T 7/60 |
| 2023/0384260 A1* | 11/2023 | Verhelst | ............... | G01N 27/416 |
| 2024/0111984 A1* | 4/2024 | Hersch | ............ | G06K 19/06037 |
| 2025/0118444 A1* | 4/2025 | Ianni | ...................... | G16H 30/40 |
| 2025/0188525 A1* | 6/2025 | Kontur | ................... | C12Q 1/6806 |
| 2025/0284910 A1* | 9/2025 | White | ............. | G06K 19/06009 |
| 2025/0285328 A1* | 9/2025 | Kim | .......................... | G06T 7/80 |

* cited by examiner

*Primary Examiner* — Allyson N Trail
(74) *Attorney, Agent, or Firm* — Polsinelli LLP/QUALCOMM Incorporated

(57) ABSTRACT

Systems and techniques are described herein for quick response (QR) code decoding. For example, a computing device can apply a filter to a QR code to blur the QR code; determine one or more areas of the filtered QR code that are associated with an error based on a light intensity variance of the one or more areas being above or below a variance threshold; and apply erasure correction to the one or more areas.

20 Claims, 11 Drawing Sheets

ERASURE-BASED QUICK RESPONSE (QR) DECODING

TECHNICAL FIELD

The present disclosure generally relates to quick response (QR) code processing and error correction. For example, aspects of the present disclosure relate to systems and methods for erasure-based QR decoding.

BACKGROUND

Quick response (QR) codes are two-dimensional images that include black squares arranged on a white grid (or other colors). The QR codes include data encoded in the black modules (also referred to as black cells) and white space of the white grid, which can be decoded using various proprietary or standard QR decoding techniques. For example, QR codes can include various data types encoded within the two-dimensional image, such as numeric characters, alphanumeric characters, strings, characters, hyperlinks, images, etc. QR codes are generally structured to include unique patterns enabling the QR code to be read, using a camera or other optical sensor, from various angles. QR codes have become a common form of distributing information as more people have smartphones capable of reading (e.g., decoding) QR codes. For example, QR codes have become a common way to distribute information from entities (e.g., businesses) to consumers, such as in restaurants to distribute menus or in parking lots to pay for parking. QR decoding techniques generally include error correction capabilities to compensate for damage to the QR codes.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, an apparatus for quick response (QR) code decoding is provided. The apparatus can include at least one memory and at least one processor coupled to the at least one memory configured to: apply a filter to a QR code to blur the QR code; determine one or more areas of the filtered QR code that are associated with an error based on a light intensity variance of the one or more areas being above or below a variance threshold; and apply erasure correction to the one or more areas.

In some aspects, an apparatus for quick response (QR) code decoding is provided. The apparatus can include at least one memory and at least one processor coupled to the at least one memory configured to: process a QR code, using a machine learning model, to generate an error confidence map including an indication that one or more areas of the QR code are associated with an error; parse the error confidence map to determine a position of the one or more areas of the QR code associated with the error; and apply erasure correction at the position of the one or more areas associated with the error.

In some aspects, a method for quick response (QR) code decoding is provided. The method can include: applying a filter to a QR code to blur the QR code; determining one or more areas of the filtered QR code that are associated with an error based on a light intensity variance of the one or more areas being above or below a variance threshold; and applying erasure correction to the one or more areas.

In some aspects, a method for quick response (QR) code decoding is provided. The method can include: processing a QR code, using a machine learning model, to generate an error confidence map including an indication that one or more areas of the QR code are associated with an error; parsing the error confidence map to determine a position of the one or more areas of the QR code associated with the error; and applying erasure correction at the position of the one or more areas associated with the error.

In some aspects, an apparatus for quick response (QR) code decoding is provided. The apparatus can include: means for applying a filter to a QR code to blur the QR code; means for determining one or more areas of the filtered QR code that are associated with an error based on a light intensity variance of the one or more areas being above or below a variance threshold; and means for applying erasure correction to the one or more areas.

In some aspects, an apparatus for quick response (QR) code decoding is provided. The apparatus can include: means for processing a QR code, using a machine learning model, to generate an error confidence map including an indication that one or more areas of the QR code are associated with an error; means for parsing the error confidence map to determine a position of the one or more areas of the QR code associated with the error; and means for applying erasure correction at the position of the one or more areas associated with the error.

In some aspects, a non-transitory computer-readable medium is provided having stored thereon instructions that, when executed by at least one processor, cause the at least one processor to: apply a filter to a QR code to blur the QR code; determine one or more areas of the filtered QR code that are associated with an error based on a light intensity variance of the one or more areas being above or below a variance threshold; and apply erasure correction to the one or more areas.

In some aspects, a non-transitory computer-readable medium is provided having stored thereon instructions that, when executed by at least one processor, cause the at least one processor to: process a QR code, using a machine learning model, to generate an error confidence map including an indication that one or more areas of the QR code are associated with an error; parse the error confidence map to determine a position of the one or more areas of the QR code associated with the error; and apply erasure correction at the position of the one or more areas associated with the error.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
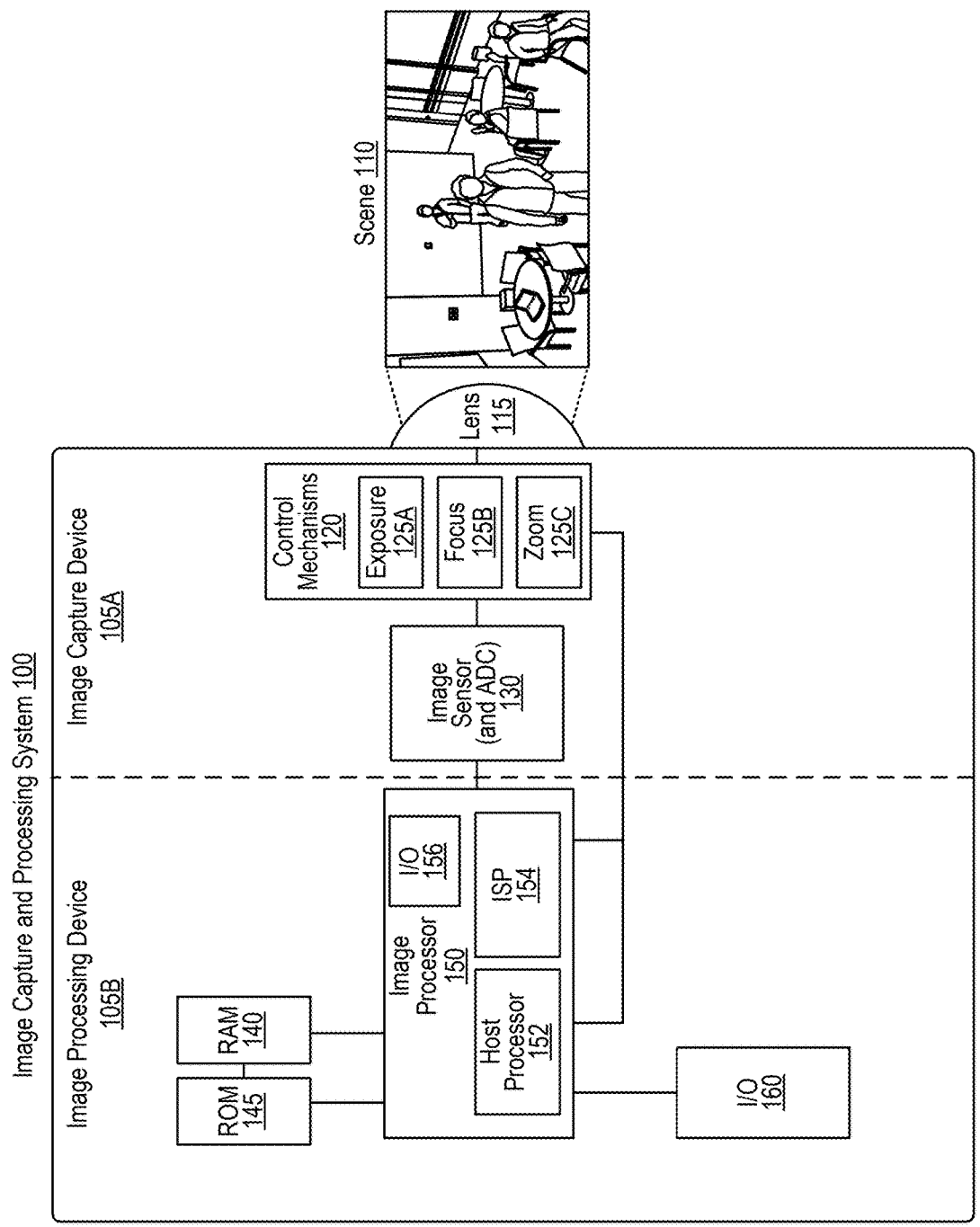
FIG. 1 is a block diagram illustrating an example architecture of an image capture and processing system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As previously mentioned, quick response (QR) codes have become a prevalent way to disseminate information. A QR code is a type of two-dimensional (2D) matrix barcode. QR codes include features such as black modules on a white background. Each cell of the 2D matrix is known as a module with fiducial markers to recognize the QR. Fiducial markers are the larger structures (e.g., formed by multiple black modules) of the QR code, generally shaped like squares with a square formed by black modules nested within a larger square formed by black modules. The fiducial markers generally are located near corners of the 2D matrix. Some fiducial markers can include finder patterns and alignment patterns which a device reading the QR code can use to recognize a QR code and align the QR code for decoding. Various techniques, standards, and proprietary methods of decoding or reading QR codes can have differing requirements for the shape and location of fiducial markers with finder patterns and alignment patterns.

QR codes are readable by imaging devices like cameras. The data encoded within a QR code can be read or decoded by the imaging devices based on the horizontal and vertical components of the QR code (e.g., the modules). Many techniques for reading QR codes include an error correction process for correcting modules of the QR code that are unable to be read by the imaging device, occluded, or damaged. Many QR codes are used to store URLs or other types of data. QR codes generally use four standardized input modes or encodings: numeric, alphanumeric, byte or binary, and kanji. The maximum amount of data that can be represented by a QR code depends on the data type (input mode or encoding), version (from 1 to 40), and error correction level of the QR code.

QR codes generally include finder patterns and alignment patterns. For example, QR codes generally include three finder patterns in the bottom-left, top-left, and top-right corners of the 2D matrix. The finder patterns are characterized by a specific black to white ratio of 1:1:3:1:1 in the horizontal and vertical directions. The finder patterns are generally surrounded by a quiet zone of 1 white module. The fiducial markers are unique within QR codes. The fiducial markers can help an electronic device identify a QR code in an image.

QR codes generally include alignment patterns. For example, QR with versions higher than 1 contain at least one alignment pattern. Alignment patterns can be used to stabilize homography of the 2D matrix. The alignment patterns can also be used to identify the fourth corner of the 2D matrix (e.g., the bottom-right corner). The alignment pattern can be characterized by a black to white ratio of 1:1:1. The number of alignment patterns present in QR codes can be based on the version of the QR code (e.g., higher versions of QR codes include more alignment patterns).

The finder patterns and alignment patterns can be used to normalize the QR code for size, orientation, and angle of viewing. The version of the QR code indicates the overall dimensions of a QR code. QR code dimensions are generally based on the following formula: d=4*v+17, where d represents the dimension in length of modules of a side of the QR code. Variable v represents the version number of the QR code. QR codes scale by 4 modules in length with each increase in version number.

A QR code can include an error correction level representing the amount of the QR code (e.g., the number of modules of the QR code) that can be corrupted, occluded, or otherwise unreadable for an electronic device and still be readable as a whole by the electronic device. The error correction level of the QR code reduces the storage capacity of the QR code (e.g., the amount of data that can be encoded in the modules) because some modules of the QR code are used as correction codewords instead of as storage for other data. The approximate error correction capability for four error correction levels is provided below:

Level L (Low): 7% of data bytes of the QR code can be restored.
Level M (Medium): 15% of data bytes of the QR code can be restored.
Level Q (Quartile): 25% of data bytes of the QR code can be restored.
Level H (High): 30% of data bytes of the QR code can be restored.

A set of 8 modules in a QR code can represent a byte of data. Blocks can sometimes be referred to as codewords when used in error correction, such as with use in Reed-Solomon error correction. Blocks: Is a set of 8 modules in a QR code, they represent a byte of data. In some QR codes, messages of the QR code can be broken up into several groups of blocks. The grouping of blocks (e.g., block groups) can affect the complexity of the decoding algorithm. The block groups can be interleaved (e.g., alternating pattern of blocks) when placed inside a QR code causing damage localized to an area or region of the QR code to be less likely to be unrecoverable.

Techniques for decoding QR codes can include using masks. Masks are modules of the QR code used to break up patterns in the area of the QR code including readable data which might confuse a scanner. For example, a large blank area can be populated with a mask. In another example, misleading features that look like the finder/alignment patterns can be populated with a mask. The mask patterns are defined on a grid that is repeated as necessary to cover the whole QR code content. The specific mask to be used during encoding (e.g., when generating the QR code) is determined by a heuristic model that scores different patterns of QR codes.

Electronic devices can perform various processes and methods for decoding QR codes from images. In one such example, an electronic device can decode a QR code by creating a pyramid based on the camera image (a level of the image pyramid corresponds to the original image at different scales). The electronic device can binarize each pyramid level and then binarize each pyramid level. The electronic device can scan the image for finder patterns of the QR code in the different pyramid levels based on a finder pattern ratio.

The electronic device can put the finder patterns in a base level of the pyramid by unsealing (e.g., descaling) the finder patterns and merging overlapping finding patterns. The electronic device can perform a grouping step where triplets of finder patterns are matched based on geometric similarities (e.g., geometric likelihood). The process can continue with the electronic device filtering out unlikely finder patterns. The electronic device can estimate the version for each group based on the location of the finder patterns within the image and the module size of the finer pattern triplet.

In some examples, decoding can further include scanning the image for alignment patterns in the original pyramid. In some examples, the electronic device can use a limited search region based on the position of the finder pattern. The electronic device can determine (or extract) homography of the QR code based on the 2D location of the finder patterns and alignment patterns in the image. Decoding can include using the homography to transform the original image into a 2D square containing only the QR code. In an example where the electronic device uses a pinhole camera to capture the image, any two images of the same planar surface in space would be related by a homography. In the context of QR codes the transformation can be used to project a planar QR code back into a 2D bit matrix representation (also referred to as a plane).

Decoding can further include creating a 2D bit matrix where a pixel corresponds to a module of the QR code while binarizing the transformed 2D bit matrix (e.g., using a local or global binarizer). In some examples, the transformed image can be subdivided into a 3×3 grid. A binarizer can be applied to the various subdivisions of the transformed image (e.g., applying an Otsu binarizer).

Decoding can further include parsing format information bits from the 2D reconstruction of the QR code. The format information bits can describe the mask pattern and error correction level of the QR code. The mask pattern can include a 2D mask that is applied to data encoded within the QR to maximize the noisiness of content and minimize the likelihood of patterns used for detection appearing in the content. Version information bits of the QR code can be parsed and used to determine or verify the QR code version.

In some examples, decoding can include parsing the modules of the QR code by traversing the QR code in a snake pattern while partitioning the content into blocks of 1 byte each. The blocks that contain data can be parsed first. In some examples, the blocks containing data parsed first can be referred to as data codewords. The blocks that are parsed last can include the error correction codewords. The electronic device performing the decoding process can sort the partitioned blocks (e.g., codewords) from the previous steps into a sequence of bytes based on version and error correction level. In some versions of QR codes, the QR codes include multiple groups of interleaved blocks so that the electronic device decoding the QR code can perform error corrections for damaged portions of the QR code (e.g., damage to sequential blocks).

The codewords of the QR code can be provided to an error-based Reed-Solomon decoder including an indicator for how many codewords are used for correction. The Reed-Solomon decoder can output the corrected data codewords. In some examples, such as when the error-based Reed-Solomon decoder is unable to output the corrected data codewords, the decoding process can include using an errata-based Reed-Solomon decoder. The errata-based Reed-Solomon decoder can additionally require erasure locations (e.g., the positions of the QR code with erased data/damaged modules).

Error correcting codes are a signal processing technique used to correct errors. Error correcting codes are used in various technologies, including QR codes, communications (e.g., cellular, internet, etc.), and data storage (e.g., hard drives, disc storage, etc.). Reed-Solomon error correction is a type of error correction code using Galois Field polynomials. Using error correction codes, such as Reed-Solomon, allows for recovery of messages (and other data or information) from corrupted messages (e.g., messages with errors).

An errata-based Reed-Solomon decoder can correct both known and unknown corrupted codewords from a sequence (referred to as erasures and errors respectively). The input to an errata-based Reed-Solomon decoder can include a sequence of data codewords and correction codewords. The output of an errata-based Reed-Solomon decoder can include corrected data codewords. In some examples, the errata-based Reed-Solomon can be used to correct one erased symbol for each correction codeword. When the error locations of erased symbols (or other errors in the QR code) are not known, two correction codewords may be needed for each corrupted codeword (e.g., in some cases the errata-based Reed-Solomon can correct half as many errors as erasures). Erasure correction can be useful in when a part of sequence is known to be corrupted as the erasure can be used to determine the unknown corrupted codewords.

The decoding process using Reed-Solomon, error-based Reed-Solomon, or errata Reed-Solomon can include computing syndrome polynomials to analyze modules (or characters associated with the modules) which are corrupted. In some examples, a Berlekamp-Massey algorithm can be used to determine the location of errors within the QR code. For example, the decoding process using Reed-Solomon can further include computing an erasure/error locator polynomial based on syndrome values. Syndrome values are numerical indicators based on a received codeword in error-correcting codes. The Berlekamp-Massey algorithm can compute the erasure/error locator polynomial to indicate the location of errors within the QR code and which codewords (or characters, binaries, etc. associated with the modules) are corrupted.

The decoding process using Reed-Solomon, error-based Reed-Solomon, or errata Reed-Solomon can include computing an erasure/error evaluator polynomial from the syndrome values and the erasure/error locator polynomial. The erasure/error evaluator polynomial can be used to determine an extent to which modules (or characters associated with the modules) were affected by the errors. The decoding process can further include computing an erasure/error magnitude polynomial based on the erasure/error evaluator polynomial, erasure/error locator polynomial, and the syndromes polynomial. The erasure/error magnitude polynomial can also be referred to as a corruption polynomial because the corruption polynomial stores values to be subtracted from a received message (e.g., a message including erasures/errors) to produce (e.g., reconstruct, generate, etc.) a correct message not including erasures/errors (i.e. with correct values for erased characters). For example, the noise is stored in the corruption polynomial. By removing the noise from the received message (e.g., the QR code including erasures/errors), the decoding process can repair the input message to include corrected values for erased characters. In some examples, a Forney algorithm can be used to correct the values for erased characters.

Systems, apparatuses, methods (also referred to as processes), and computer-readable media (collectively referred to herein as "systems and techniques") are described herein that provide image processing techniques of QR using erasure-based decoding. The systems and techniques can use erasure-based decoding to predict or recover data encoded within damaged portions of a QR code. In some aspects, the systems and techniques can use filters or machine learning models to identify damaged portions of QR codes.

In some aspects, the systems and techniques can use a filter to identify damaged, erased, or occluded portions of QR codes. For example, an electronic device can receive an image associated with a QR code. In some examples, the systems and techniques can include applying padding (e.g., applying white modules) to the QR code when identifying the QR code from the image. For example, when the QR code is occluded, or partially covered by an object within the image, the systems and techniques can include padding the portion of the QR code that is occluded with white modules. For example, the padding can be applied to a reconstructed QR code.

In some aspects, the electronic device can apply a filter to the QR code to blur the QR code. For example, a Gaussian filter (e.g., a strong Gaussian filter) can be applied to a QR code to blend or blur modules of the QR code such that the light intensity (e.g., black or white) of modules neighboring one another are averaged or otherwise adjusted based on the light intensity of neighboring modules. Filters of various sizes can be applied to the QR code, for example, a 5×5 Gaussian filter (e.g., 5 pixel by 5 pixel, 5 module by 5 module). In such an example, each pixel of the QR code can be mapped to a corresponding module of a reconstructed QR code (e.g., one pixel mapped to one module on the reconstructed QR code).

The systems and techniques can include determining areas of the filtered QR code with variance in light intensity lower than a variance threshold. Variance can refer to a degree of difference in light intensity or color of portions of a QR code from other portions of the QR code. The variance threshold can be a predetermined value of light intensity or color. When the light intensity of portions (e.g., parsed blocks) of the filtered QR code do not exceed the variance threshold, the portions can be determined to be errors or include errors (e.g., identified as the location where errors are present in the QR code). In some examples, the systems and techniques can include generating an erasure mask associated with the variances. For example, areas of the filtered QR code that have a variance lower than the variance threshold can be represented as black modules of the erasure mask. Areas of the filtered QR code that have a variance lower than the variance threshold can be represented as white modules of the erasure mask.

The erasure mask can be parsed to determine erasure locations of the erased modules (or characters associated with the modules) of the QR code. The erasures from the erasure mask can be provided as input to an erasure-based Reed-Solomon algorithm to correct erased values of the QR code. The erased values can be added to the QR code to repair the QR code.

In further examples of QR code decoding and correction using a filter, the systems and techniques can use a filter to identify damaged, erased, or occluded portions of QR codes (e.g., individual modules or multiple modules). In some aspects, the QR code can be a reconstructed and binarized QR code (2D bit matrix) including erasures such as from damage, glare, occlusions, etc. In the reconstructed and binarized QR code, each module can be represented by a single pixel with values from 0 to 255. In some aspects, because the QR code is binarized, the values of the modules are either 0 (black) or 255 (white). In some aspects, the decoding process can include padding the 2D bit matrix by adding pixels to a portion of the 2D bit matrix. For example, the padding can be added to edges of the 2D bit matrix. In some aspects, a filter can be applied to the 2D bit matrix. For example, a gaussian filter, such as a 5×5 (e.g., 5 pixel by 5 pixel or 5 module by 5 module) filter can be used to blur the QR code so that only areas of the QR code that are only black or only white remain at or near (e.g., within a variance threshold) the binarized 0 (black) or 255 (white) values. In some aspects, the decoding process can include removing the padding from the 2D bit matrix.

In some aspects, the decoding process can include using a variance threshold to generate an erasure mask. In some examples, the variance threshold can be variable. For example, values of modules or pixels under a 10% percentile of the image or over the 90% of the image can be set to white in the erasure mask. The rest of the erasure mask can be set to black. Generating the erasure mask identifies uniform areas of the filtered QR code based on whether areas of the erasure mask are white or black. In such an example, the modules above or below the variance threshold can be determined to be corrupted based on the variance.

An erasure mask is a 2D bit matrix representing a binary mask of the same size as the reconstructed 2D bit matrix. The erasure mask represents a direct mapping from the erasure mask back to the reconstructed 2D bit matrix for every module. The erasure mask represents modules that are to be considered corrupted, because QR codes are by definition noisy within a 2D bit matrix.

In some aspects, the decoding process using a filter can include parsing the erasure mask. In some examples, the decoding process can include following the same order as the rest of the blocks in the QR and extracting the index of the blocks (codewords) that should be considered an erasure. In some examples, any block with at least one corrupted bit is considered an erasure (e.g., white modules in the erasure mask).

In examples where there are more corrupted codewords than the maximum number of possible erasures for the QR then the decoding process can prioritize blocks of the QR code with the largest number of corrupted bits.

In some aspects, the systems and techniques can use a machine learning model to identify damaged, erased, or occluded portions of QR codes and correct (e.g., repair) the QR code. A decoding and correction process using the machine learning model can include generating a 2D bit matrix reconstruction of a QR code. For example, the decoding process can include generating a 2D bit matrix reconstruction of a QR code from an image including a QR code. In some aspects, the process can include resizing the 2D bit matrix to a predefined reference size such that the machine learning model can be used for any QR version. In some examples, the decoding process can include selecting a machine learning model based on the QR version.

In some aspects, the decoding process can include mapping the 2D bit matrix to tensors for the machine learning model and receiving output tensors representing a confidence map. The confidence map can be a map of probabilities associated with whether individual modules or blocks of the QR code include errors or erasures. In some examples, the confidence map can be represented as a heat map, with hotter colors representing an increased probability that corresponding modules of the QR code include erasures or errors. In some aspects, the decoding process can include sampling the confidence map to adjust the size of the confidence map to the size of the original 2D bit matrix representation of the QR code.

In some aspects, the decoding process using a machine learning model can include parsing the confidence map. For example, the decoding process can include parsing the confidence map using a snake pattern to map confidence (e.g., probabilities) of the confidence map to the modules of the 2D bit matrix. The decoding process can include summing a total confidence per block of the 2D bit matrix and normalizing the confidence to a [0, 1] range. In some aspects, the blocks of the 2D bit matrix can be ranked. Blocks with a total confidence lower than a confidence threshold (e.g., lower than 0.5) can be discarded. The ranking can allow that only the most likely blocks to be erasures (determined based on the confidences/probabilities) are considered erasures.

In some aspects, the decoding process using a machine learning model can include truncating a set of blocks likely to be erasures (e.g., blocks with confidence higher than the confidence threshold) up to a maximum number of possible erasures for the 2D bit matrix while still being readable. In some aspects, the decoding process can include outputting a set of selected block indices (e.g., the indices associated with the blocks greater than the confidence threshold) associated locations of modules of the QR code including erasures. The block indices can be provided to an erasure-based Reed-Solomon algorithm to correct the erasures. In such an example, the input to the Reed-Solomon algorithm can be the indice(s) of a codeword corresponding to a masked block.

Various aspects of the application will be described with respect to the figures below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene 110 toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 11:
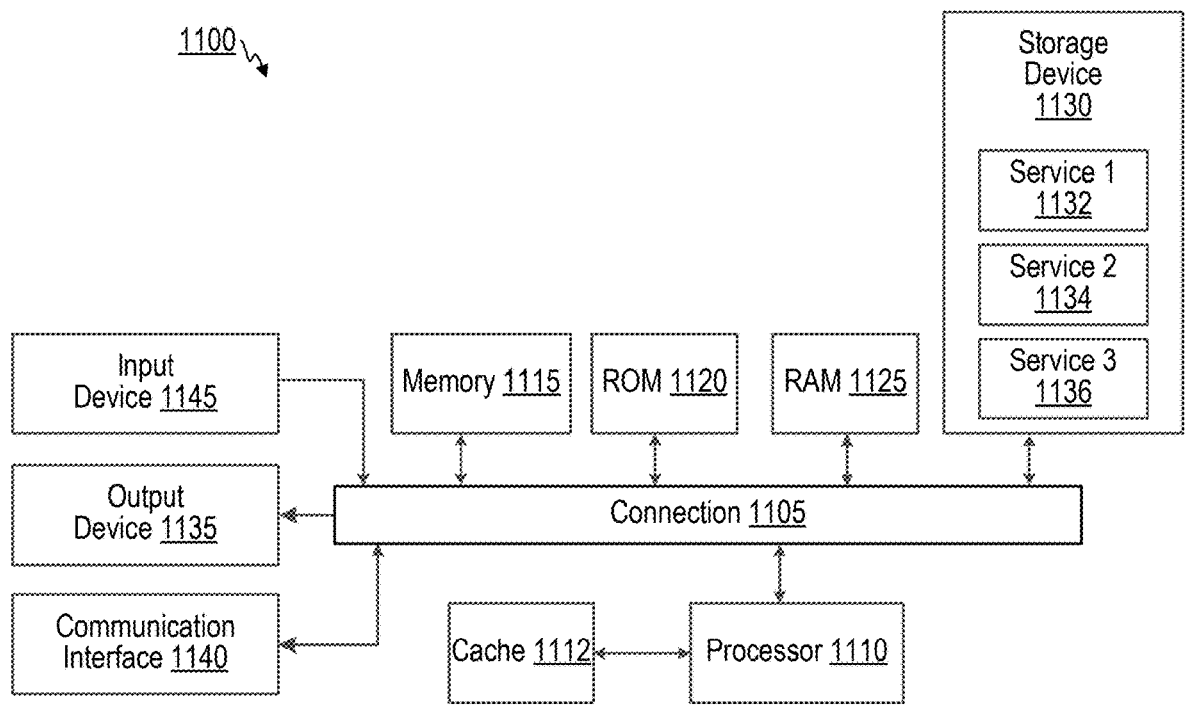
FIG. 11 is a diagram illustrating an example of a system for implementing certain aspects described herein.

The image processor 150 may include one or more processors, such as one or more image signal processors (ISPs) (including ISP 154), one or more host processors (including host processor 152), and/or one or more of any other type of processor 1110 discussed with respect to the computing system 1100 of FIG. 11. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO)

interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices, any other input devices, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.10 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

In some examples, the image capture and processing system 100, the image capture device 105A, the image processing device 105B, or a combination thereof, can be part of the computing system 1100 of FIG. 11. In some examples, the image capture and processing system 100 can be used to capture images of QR codes. In further examples, the image capture and processing system 100 can perform various QR decoding techniques further described in the descriptions of FIG. 4, FIG. 5, FIG. 6, FIG. 7, and FIG. 8.

Figure 2:
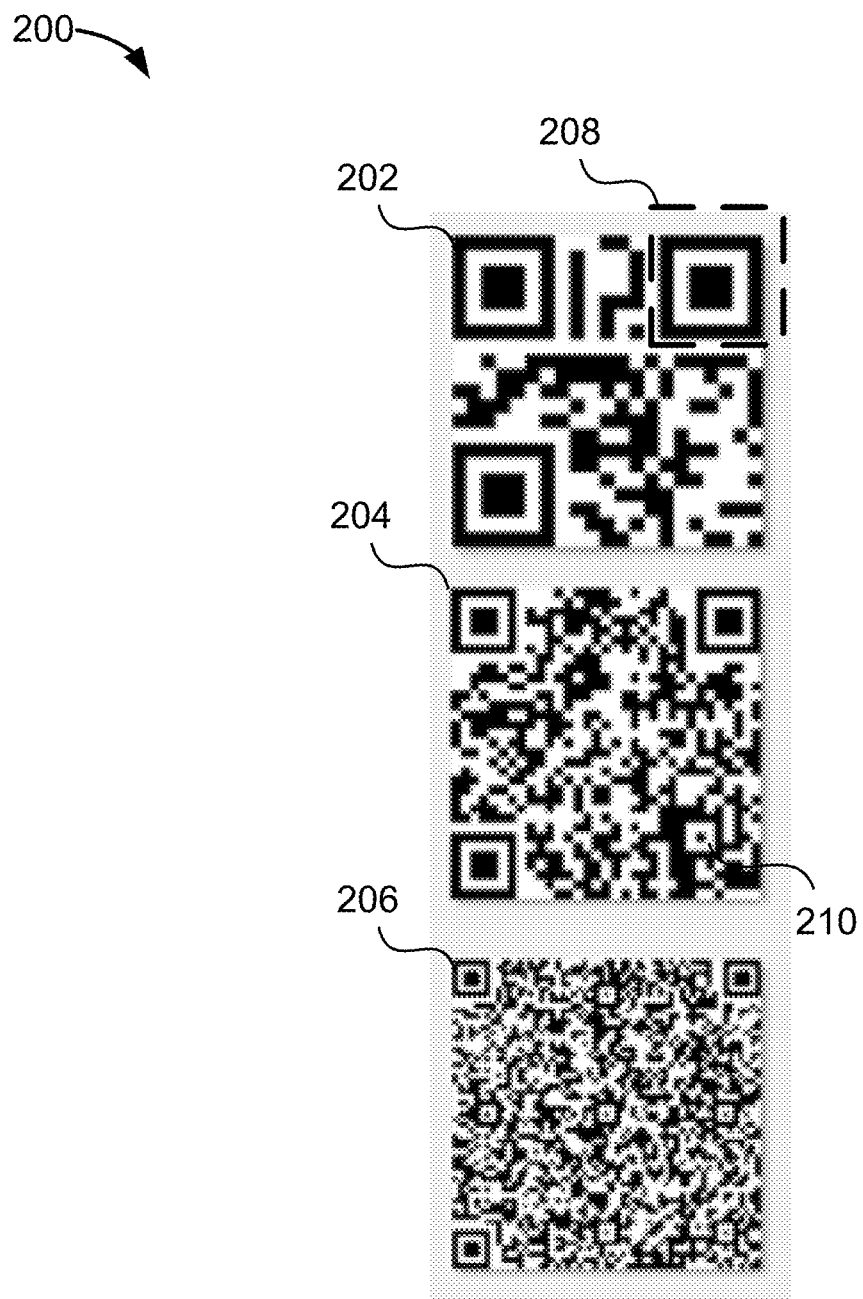
FIG. 2 is a block diagram illustrating various versions of quick response (QR) codes, in accordance with some examples.

FIG. 2 is a block diagram 200 illustrating QR codes of various sizes (e.g., QR codes of different versions). The QR codes illustrated in FIG. 2 have modules of different sizes. In some examples, the QR codes can be illustrated as having modules of the same size causing the first QR code 202 to be smaller than the second QR code 204 which in turn would be caused to be smaller than the third QR code 206.

The version of QR codes can be represented by the following equation: $d=4*v+17$, where d represents the dimension in length of modules of a side of the QR code. Variable v represents the version number of the QR code. QR codes scale by 4 modules in length with each increase in version number.

By way of non-limiting example, the first QR code 202 is a version 1 QR code as illustrated by the dimensions of the first QR code 202 being 21 modules. The second QR code 204 is a version 4 QR code as illustrated by the dimensions of the second QR code 204 being 33 modules. The third QR code 206 is a version 10 QR code as illustrated by the dimension of the third QR code 206 being 57 modules.

A finder pattern of the first QR code 202 is illustrated as finder pattern 208. An alignment pattern of the second QR code 204 is illustrated as alignment pattern 210. QR codes generally include a finder pattern to assist in identifying QR codes from an image. Further, QR codes generally include alignment patterns to assist in decoding QR codes by providing a reference point to align modules of the QR code.

Figure 3:
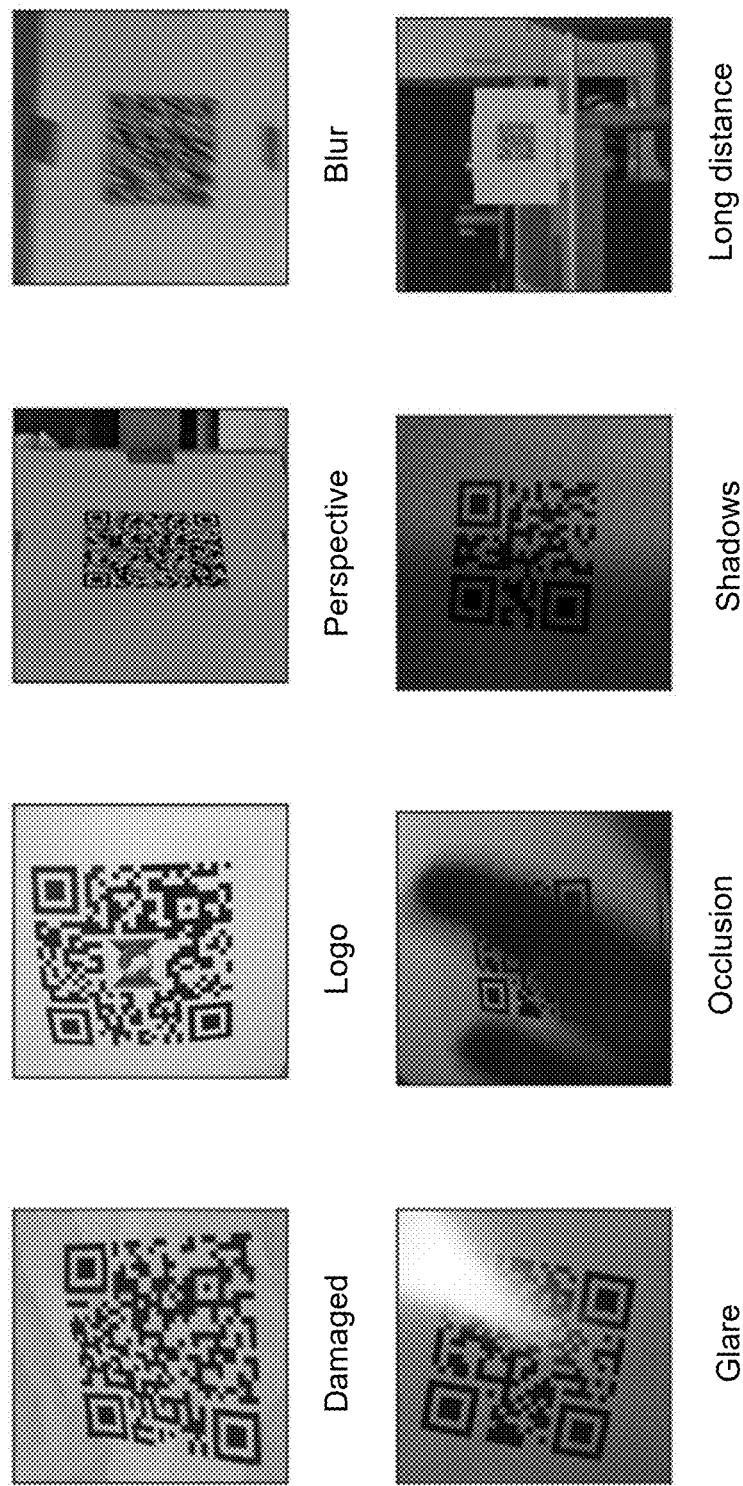
FIG. 3 is a block diagram illustrating various QR codes including erasures and errors, in accordance with some examples.

FIG. 3 is a block diagram 300 illustrating various QR codes including erasures and errors. By way of non-limiting example, the errors in the QR codes illustrated in FIG. 3 are erasures and errors resulting from exposure to the environment or erasures and errors introduced when capturing an image of the QR codes. Examples of erasures and errors introduced when capturing the image can include glare, shadows, blur (e.g., an image in motion or resulting from lens distortion), perspective erasures (e.g., taking an image of the QR code at an angle not orthogonal to the QR code), distance erasures (e.g., taking an image of the QR code at a distance far enough away to be unable to discern one or more modules of the QR code). Other erasures and errors can include erasures and errors due to occlusion of the QR code (e.g., part of the QR code is covered by another object) or damage to the QR code (e.g., part of the QR code bleaching due to sunlight, scratches on the QR code, etc.).

Figure 4:
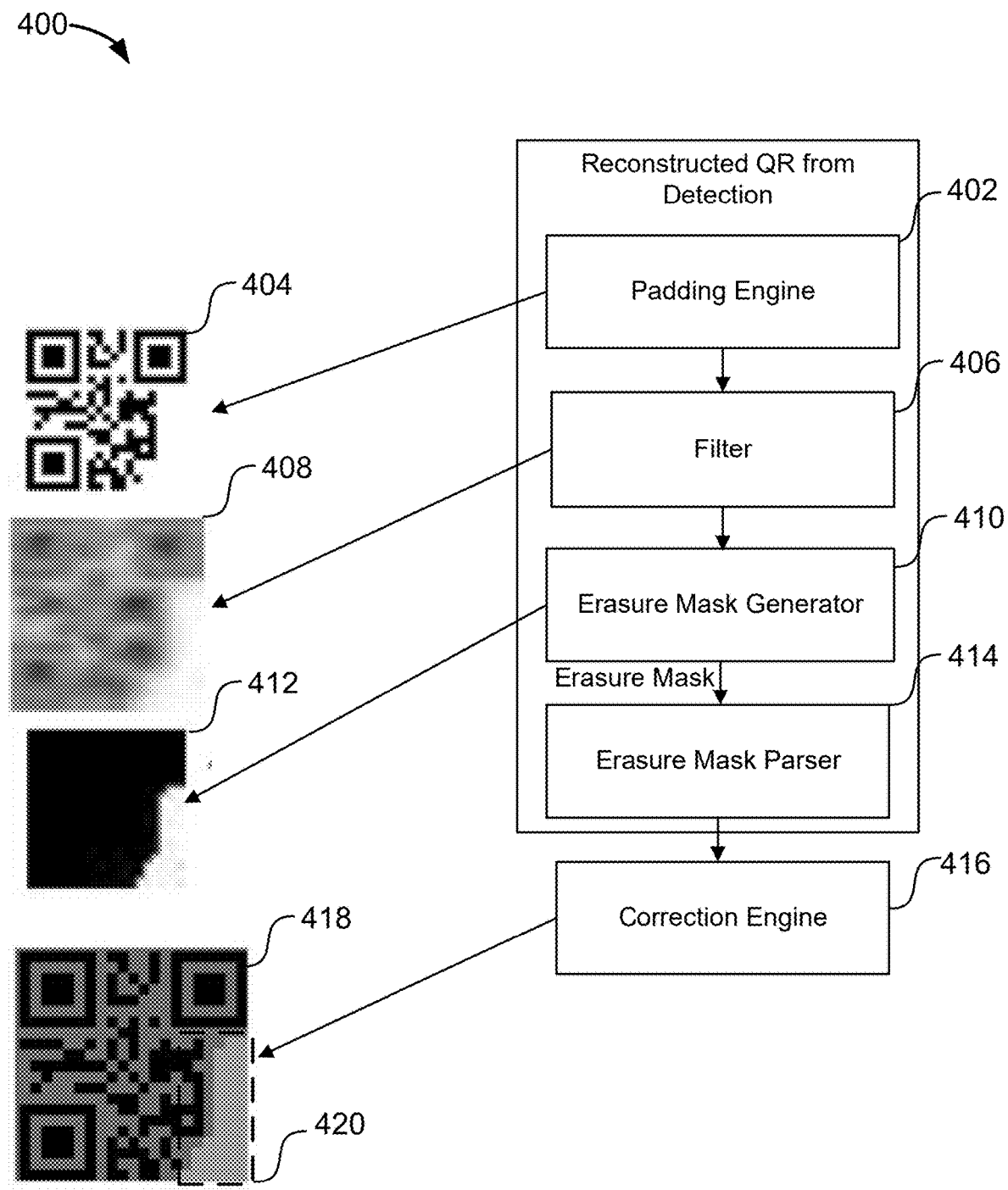
FIG. 4 is a block diagram illustrating an example system for error correction of QR codes, in accordance with some examples.

FIG. 4 is a block diagram illustrating an example system 400 for error correction of QR codes. The example system 400 includes a padding engine 402, a filter 406, an erasure mask generator 410, an erasure mask parser 414, and a correction engine 416. In some examples, one or more of the padding engine 402, the filter 406, the erasure mask generator 410, the erasure mask parser 414, and the correction engine 416 can be combined into one or more different component or can be part of the image capture and processing system 100 of FIG. 1, the computing system 1100 of FIG. 11, or other various computing devices.

The example system 400 can receive a QR code or a 2D bit matrix associated with a QR code. For example, the example system 400 can receive an image including the QR code. In a pre-processing step, or as part of the example system 400, the example system can generate a reconstructed and binarized representation of the QR code as a 2D bit matrix. The 2D bit matrix can include erasures from damage, glare, occlusions, and the various other erasures described in the description of FIG. 3. In the reconstructed and binarized QR code, each module of the QR code can be represented by a single pixel with values from 0 to 255. In some examples, the values are either 0 (black) or 255 (white) because the 2D bit matrix is binarized.

The padding engine 402 can receive the reconstructed and binarized 2D bit matrix. The padding engine 402 can pad the 2D bit matrix by adding pixels (e.g., black or white modules) to a portion of the 2D bit matrix. For example, the pixels or modules can be added to edges of the 2D bit matrix to create a frame of pixels around the 2D bit matrix. Padded 2D bit matrix 404 illustrates an example 2D bit matrix representation of a QR code with padding added to the edges of the 2D bit matrix.

The filter 406 can be applied to the padded 2D bit matrix 404 to blur the 2D bit matrix (e.g., to blur the QR code). For example, the filter 406 can be a gaussian filter. In one example, the filter 406 can be a 5×5 gaussian filter (e.g., 5 pixel by 5 pixel or 5 module by 5 module) used to blur the padded 2D bit matrix 404 so that areas of the padded 2D bit matrix 404 that are only black or only white remain at or near (e.g., within a variance threshold) the binarized 0 (black) or 255 (white) values. Blurred 2D bit matrix 408 represents the padded 2D bit matrix 404 after being blurred using filter 406. In some examples, the padding added to the 2D bit matrix can be removed from the blurred 2D bit matrix 408.

The erasure mask generator 410 can receive the blurred 2D bit matrix 408. The erasure mask generator 410 can generate an erasure mask 412 associated with the blurred 2D bit matrix 408. In some examples, the erasure mask generator 410 can use the variance threshold to generate the erasure mask 412. In some examples, the variance threshold can be variable. For example, values of modules or pixels of the blurred 2D bit matrix 408 under a 10% percentile or over the 90% percentile of the blurred 2D bit matrix 408 can be set by the erasure mask generator 410 to white in the erasure mask 412. The rest of the erasure mask 412 can be set to black (e.g., the pixels not under 10% percentile and not over the 90% percentile). The erasure mask 412 can indicate uniform areas of the blurred 2D bit matrix 408, which is an indicator that an area of the 2D bit matrix includes erasures.

The erasure mask 412 can represent a binary mask of the same size as the 2D bit matrix received by the example system 400. The erasure mask 412 can represent a direct mapping from the erasure mask 412 to the received 2D bit matrix for every module or pixel. The erasure mask parser 414 can parse the erasure mask such as by extracting indices associated with blocks of the 2D bit matrix determined to include erasures based on the erasure mask 412. The erasure mask parser 414 can provide the indices to the correction engine 416.

The correction engine 416 can use various correction techniques to correct the erasures of the 2D bit matrix. In some examples, the correction engine 416 can use various erasure-based Reed-Solomon techniques to correct the erasures. Corrected 2D bit matrix 418 represents a 2D bit map with erasures 420 corrected by the correction engine 416.

Figure 5:
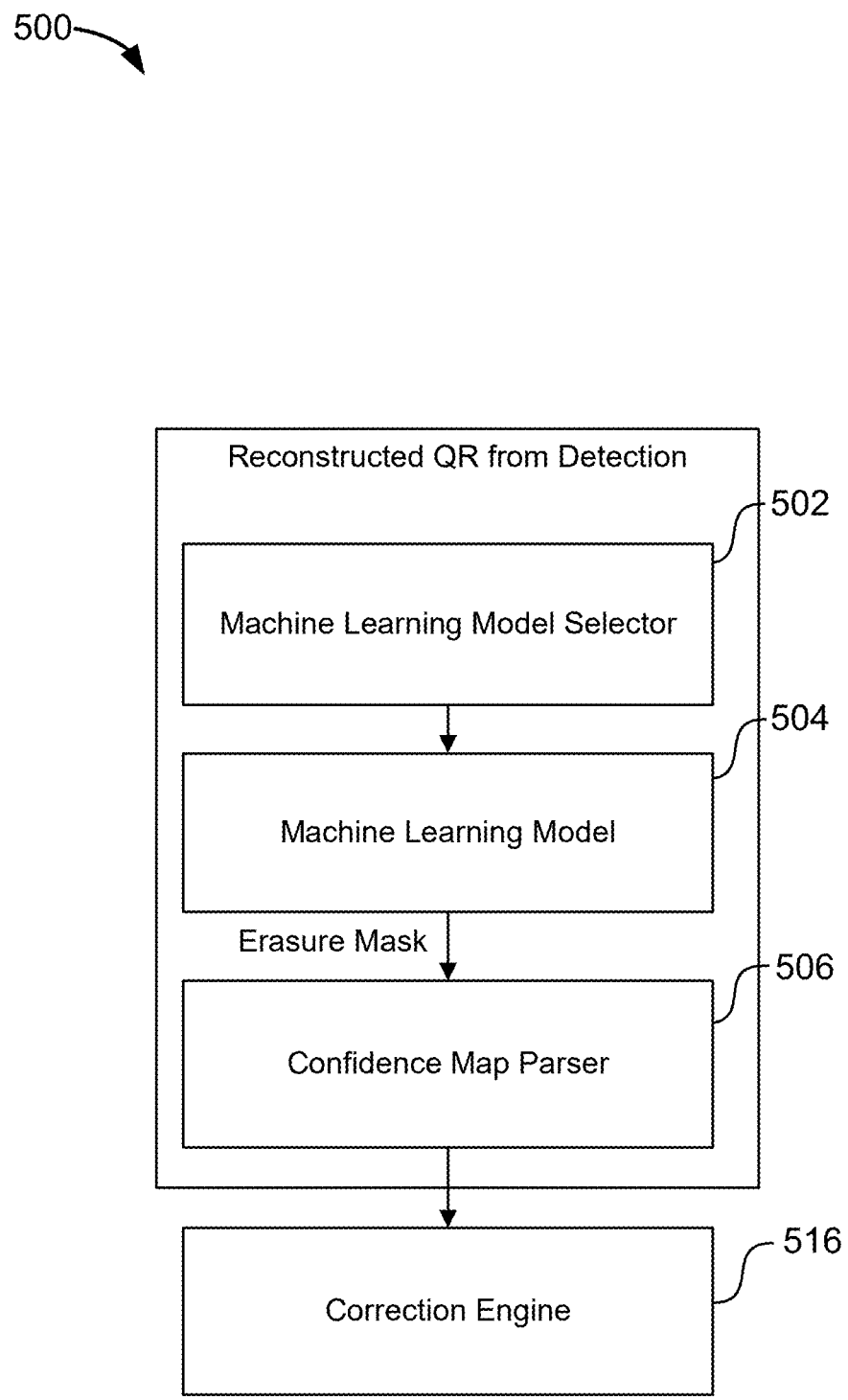
FIG. 5 is a block diagram illustrating an example system for error correction of QR codes using a machine learning model, in accordance with some examples.
Figure 9:
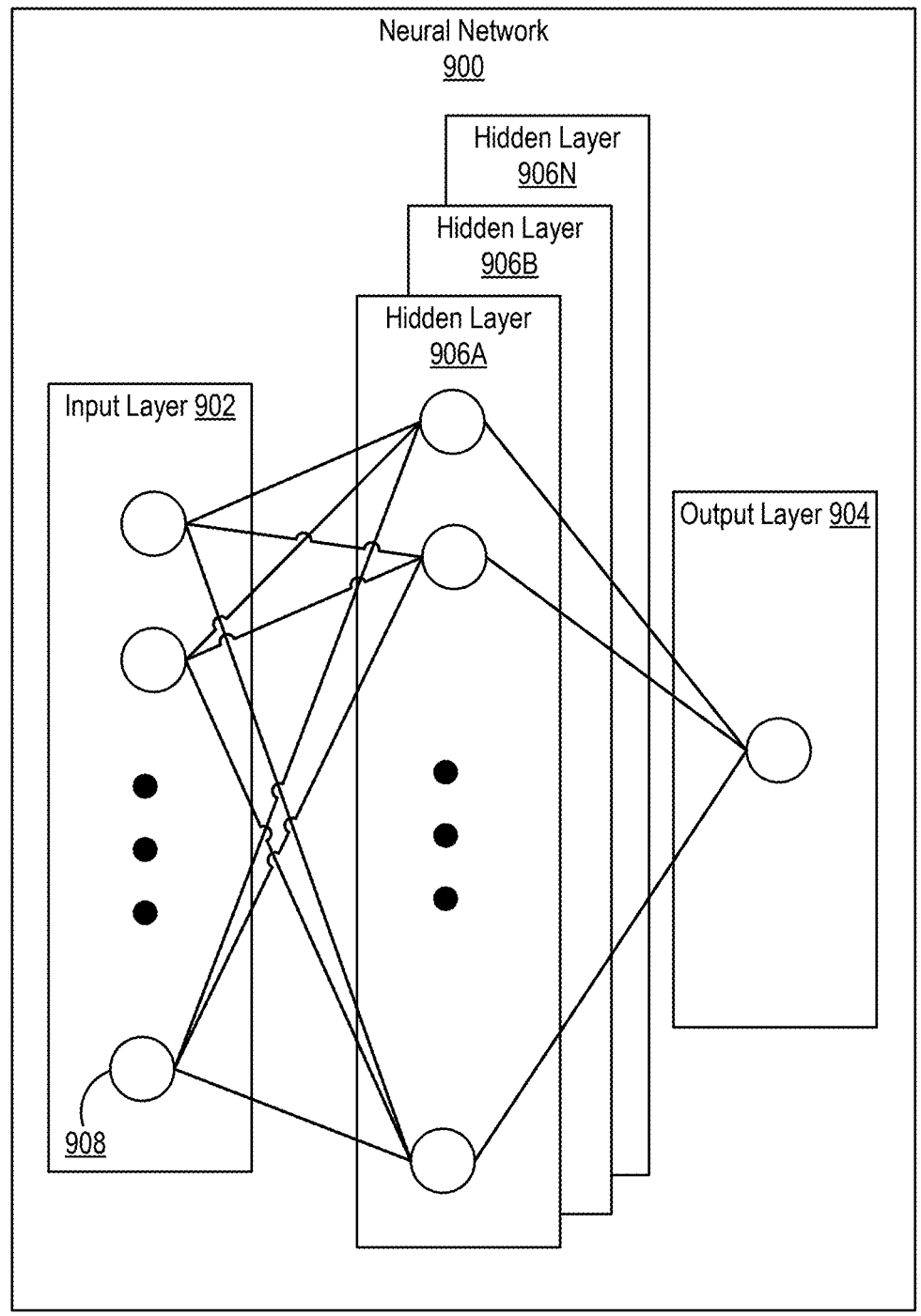
FIG. 9 is a block diagram illustrating an example machine learning model, in accordance with some examples.
Figure 10:
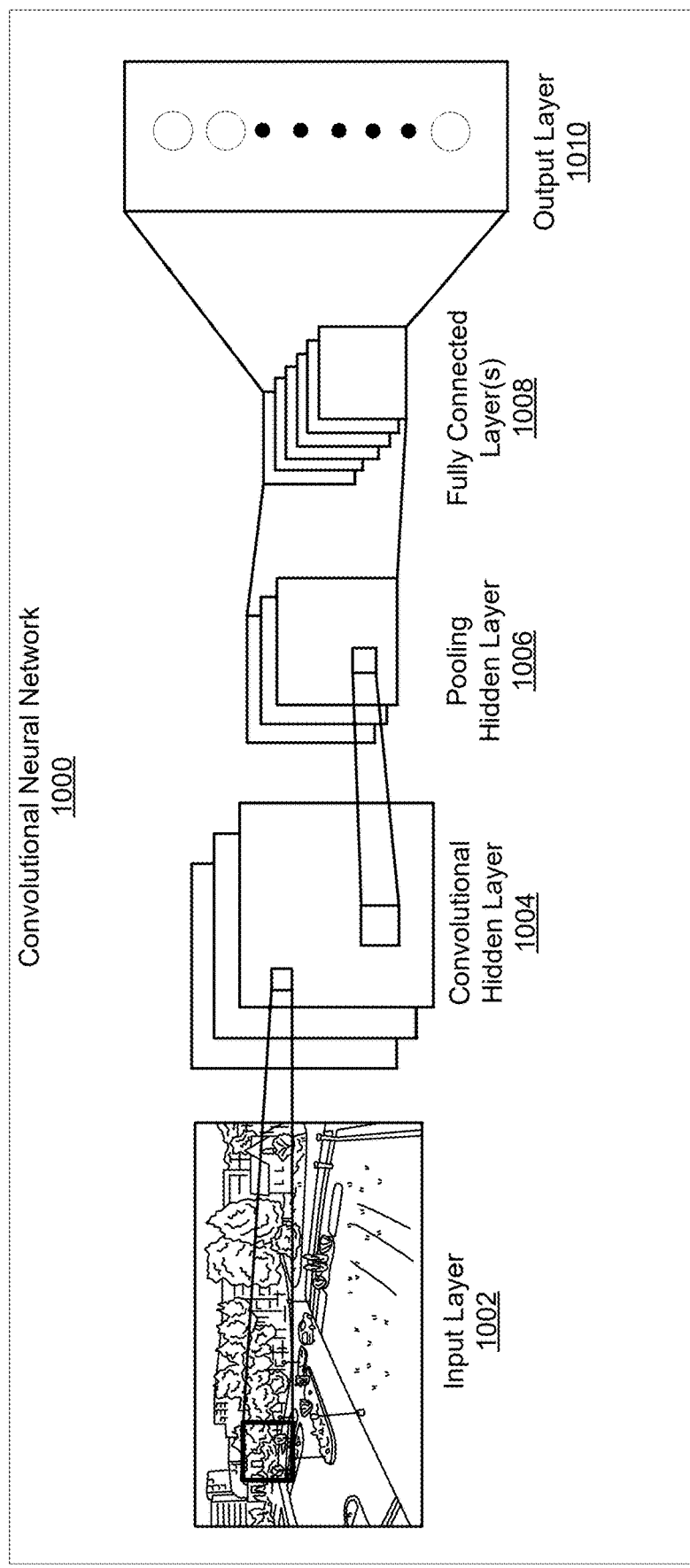
FIG. 10 is a block diagram illustrating an example convolutional neural network, in accordance with some examples.

FIG. 5 is a block diagram illustrating an example system 500 for error correction of QR codes using a machine learning model, such as the machine learning models further described in the descriptions of FIG. 9 and FIG. 10. Example system 500 includes a machine learning model selector 502, a machine learning model 504, a confidence map parser 506, and a correction engine 516.

The machine learning model selector 502 can receive a 2D bit matrix representation of a QR code and select a machine learning model based on the version of the QR code represented by the 2D bit matrix. For example, a 2D bit matrix representation of a version 1 QR code can use a first machine learning model and a 2D bit matrix representation of a version 2 QR code can use a second machine learning model. The machine learning model selector 502 selects the machine learning model used as the machine learning model 504. In some examples, the machine learning model can be a neural network, such as a convolutional neural network as further described in the description of FIG. 9 and FIG. 10. In further examples, the machine learning model 504 can include other neural network and transformer architecture.

The machine learning model 504 can receive the 2D bit matrix. The machine learning model 504 can map the 2D bit matrix to tensors of the machine learning model 504 and receive output tensors representing a confidence map. The confidence map can be an erasure map of probabilities associated with whether individual modules or blocks of the 2D bit matrix include erasures. In some examples, the confidence map is represented as a heat map, with hotter colors representing an increased probability that corresponding modules of the 2D bit matrix include erasures.

The machine learning model 504 can output the confidence map. The confidence map parser 506 can parse the confidence map to identify portions of the confidence map associated with erasures. For example, confidence map can be a 1 to 1 map of probabilities of blocks, pixels, or modules of the 2D bit matrix includes erasures. In some examples, the confidence map parser can sum confidences per block (e.g., section of the 2D bit matrix) and normalize the sums to a range of [0,1]. Blocks with a total confidence (e.g., summed and normalized confidence/probability) lower than a confidence threshold can be discarded. The remaining blocks can be determined to include erasures. In some examples, the confidence map parser 506 can truncate a set of blocks likely to be erasures (e.g., blocks with confidence higher than the confidence threshold). The confidence map parser 506 can output indices associated with the set of blocks to the correction engine 516 to correct the 2D bit matrix. The block indices can be provided to an erasure-based Reed-Solomon algorithm to correct the erasures and generate a corrected 2D bit matrix representation of the QR code.

The correction engine 516 can use various correction techniques to correct the erasures of the 2D bit matrix. For example, the correction engine 516 can use erasure-based Reed-Solomon techniques to correct the erasures and output a corrected 2D bit matrix representation of the QR code. In some examples, the correction engine 416 can use various erasure-based Reed-Solomon techniques to correct the erasures. Corrected 2D bit matrix 418 represents a 2D bit matrix with erasures 420 corrected by the correction engine 416.

Figure 6:
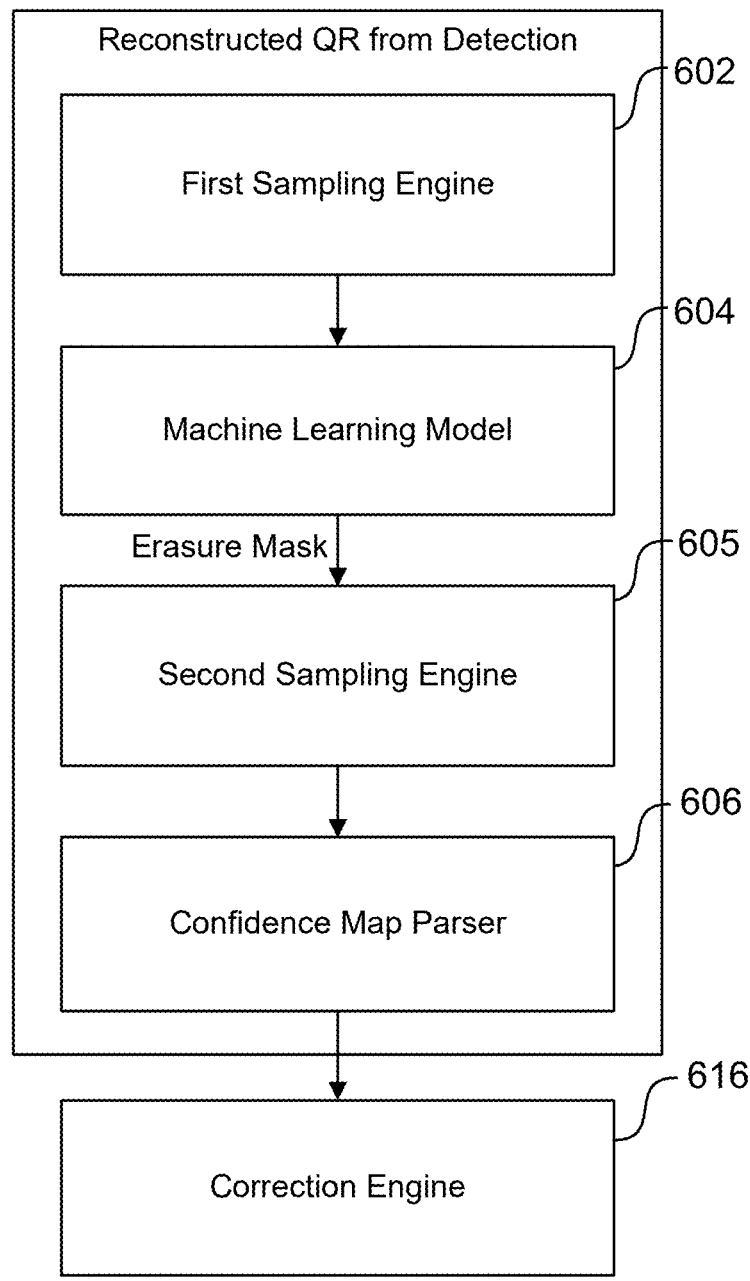
FIG. 6 is a block diagram illustrating another example system for error correction of QR codes using a machine learning model, in accordance with some examples.

FIG. 6 is a block diagram illustrating an example system 600 for error correction of QR codes using a machine learning model, such as the machine learning models further described in the descriptions of FIG. 9 and FIG. 10. Example system 600 includes a first sampling engine 602, a machine learning model 604, a second sampling engine 605, a confidence map parser 606, and a correction engine 616.

The first sampling engine 602 can receive a 2D bit matrix representation of a QR code. The first sampling engine 602 can sample the 2D bit matrix representation and generate an updated 2D bit matrix representation having dimensions matching a reference 2D bit matrix. For example, where the reference 2D bit matrix has dimensions associated with a version 4 QR code and the 2D bit matrix received by the first sampling engine 602 is associated with a version 1 QR code, the first sampling engine 602 can convert the received 2D bit matrix to match the dimensions of the reference 2D bit matrix.

The first sampling engine 602 can provide the converted 2D bit matrix to the machine learning model 604. In some examples, the machine learning model 604 is trained to identify erasures of 2D bit matrices having the dimensions of the reference 2D bit matrix. By converting the received 2D bit matrix into the reference dimensions, the first sampling engine 602 can prepare the 2D bit matrix to be received by the machine learning model 604.

As further discussed in the description of machine learning model 504 of FIG. 5, the machine learning model 604 can map the converted 2D bit matrix to tensors of the machine learning model 604. The machine learning model 604 can output a confidence map. The confidence map can be an erasure map of probabilities associated with whether individual modules or blocks of the converted 2D bit matrix include erasures. In some examples, the confidence map is represented as a heat map. Further description of the confidence map is provided in the description of FIG. 5.

The confidence map can be received by the second sampling engine 605. In some examples, the second sampling engine 605 and the first sampling engine 602 can be the same component. The second sampling engine 605 can adjust the dimensions of the confidence map to the dimensions of the 2D bit matrix initially received by the first sampling engine 602. The updated confidence map having matching dimensions of the 2D bit matrix received by the first sampling engine 602 can be received by the confidence map parser 606.

The confidence map parser 606 can parse the confidence map to identify portions of the confidence map associated with erasures. In some examples, the confidence map parser can sum confidences per block of the 2D bit matrix and normalize the sums to a range from 0 to 1. The blocks associated with confidences below a confidence threshold can be discarded and the remaining blocks can be determined to include erasures. The confidence map parser 606 can output indices associated with the blocks determined to include erasures.

The correction engine 616 can receive the indices associated with erasures and correct the erasures of the 2D bit matrix. In some examples, the correction engine 616 can use various correction techniques such using erasure-based Reed-Solomon algorithms to correct the erasures. In some examples, the correction engine 616 can output a corrected 2D bit matrix representation of the QR code with erasures populated with corrected values (e.g., corrected modules of the QR code).

Figure 7:
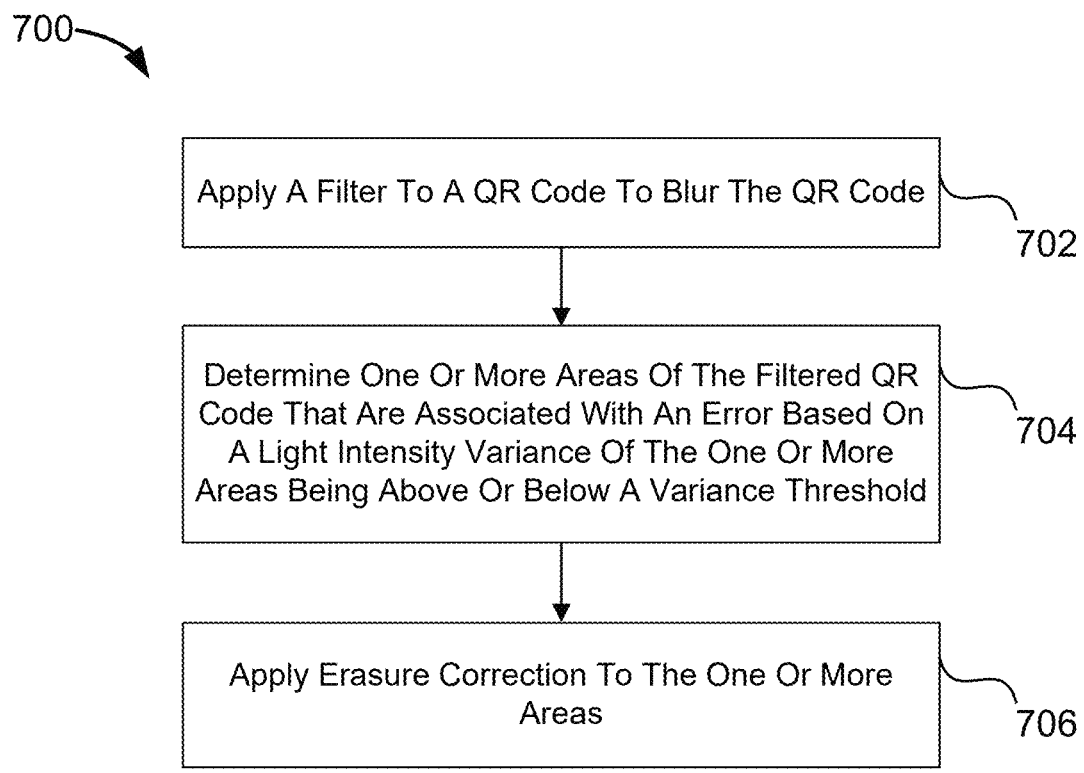
FIG. 7 is a flow diagram illustrating an example process for error correction of QR codes using a filter, in accordance with some examples.

FIG. 7 is a flow diagram illustrating an example of a process 700 for erasure-based QR decoding and error correction using a machine learning model. The process 700 can be performed by a computing device (e.g., image capture and processing system 100 of FIG. 1, computing device or computing system 1100 of FIG. 11, etc.) or by a component or system (e.g., the neural networks of FIGS. 9 and 10, a chipset, one or more processors central processing units (CPUs), digital signal processors (DSPs), graphics processing units (GPUs), any other type of processor(s), any combination thereof, or other component or system) of the computing device. The operations of the process 800 can be implemented as software components that are executed and run on one or more processors (e.g., processor 1102 of FIG. 11 or other processor(s)) of the computing device. Further, the transmission and reception of signals by the computing device in the process 800 can be enabled, for example, by one or more antennas and/or one or more transceivers (e.g., wireless transceiver(s)).

At block 702, the computing device (or component thereof) can apply a filter to a QR code to blur the QR code. For example, the computing device can use a filter, such the filter 406 of FIG. 4, to blur the QR code. The QR code can be a reconstruction of a QR code, such as a reconstruction of the various QR codes including errors, occlusions, etc. of FIG. 3. The filter can be applied to the QR code (e.g., a reconstructed QR code including padding such as the padded 2D bit matrix 404 of FIG. 4) to blur the QR code. In such an example, the filter can be a gaussian filter (e.g., a 5×5 gaussian filter) used to blur the QR code so that areas of the QR code which are only black or only white remain at or near (e.g., within a variance threshold) binarized 0 (black) or 255 (white) values. In some examples, the QR code is a reconstruction of an occluded QR code. The reconstruction can be based on an application of white areas or black areas (e.g., an erasure mask such as the erasure mask generated by erasure mask generator 410 of FIG. 4) over one or more occlusions of the occluded QR code.

At block 704, the computing device (or component thereof) can determine one or more areas of the filtered QR code that are associated with an error based on a light intensity variance of the one or more areas being above or below a variance threshold. In some examples, the computing device (or component thereof) can use a machine learning model, algorithm, application, engine, etc. to compare the light intensity of areas of the filtered QR code to the variance threshold. For example, the computing device (or component thereof) can use the erasure mask generator (e.g., the erasure mask generator 410 of FIG. 4) to generate an erasure mask (e.g., the one or more areas of the filtered QR code).

At block 706, the computing device (or component thereof) can apply erasure correction to the one or more areas (e.g., to correct the content of the QR code). In some examples, the computing device can use various erasure correction techniques such as erasure-based Reed-Solomon correction. In such an example, a correction engine, such as the correction engine 416 of FIG. 4 can correct areas of the QR code (e.g., the reconstruction of the QR code) which include errors, are occluded, etc. using erasure-based Reed-Solomon correction.

Figure 8:
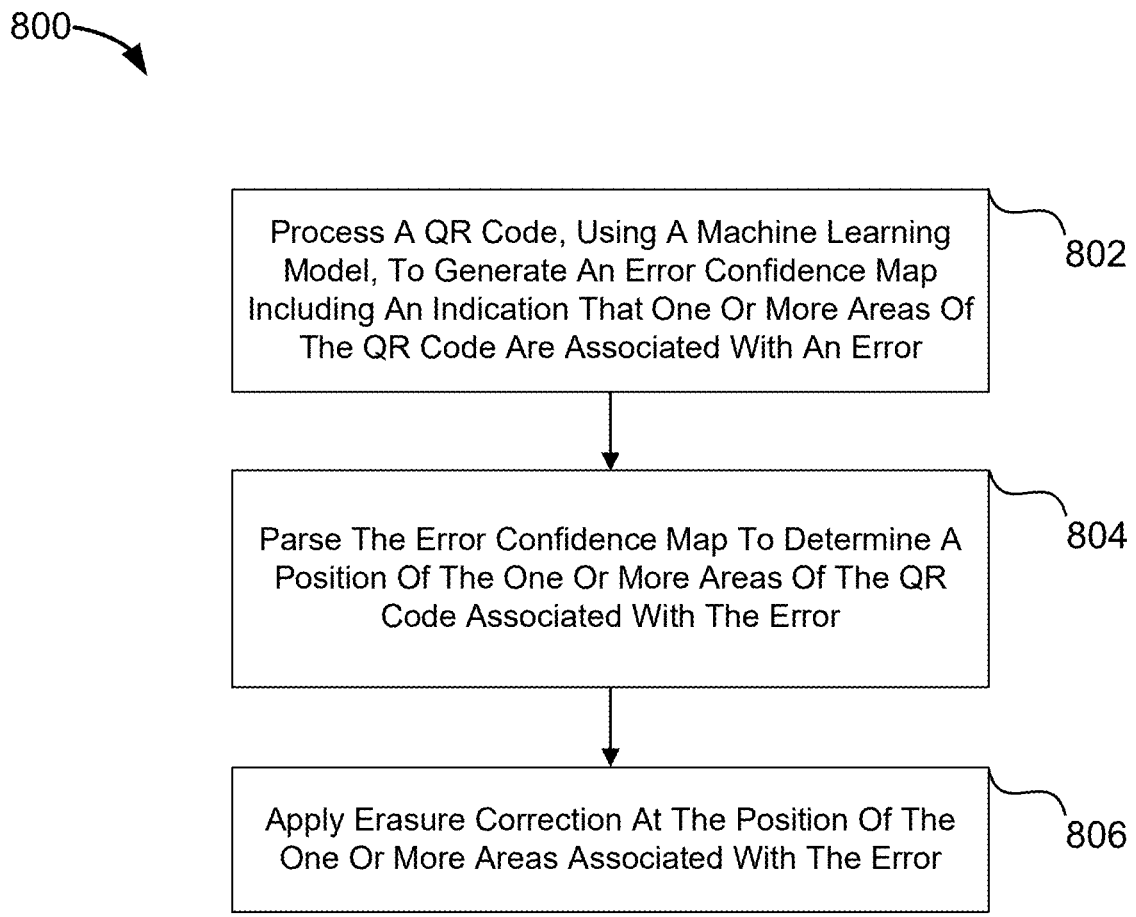
FIG. 8 is a flow diagram illustrating another example process for error correction of QR codes using a machine learning model, in accordance with some examples.

FIG. 8 is a flow diagram illustrating an example of a process 800 for erasure-based QR decoding and error correction using a machine learning model. The process 800 can be performed by a computing device (e.g., image capture and processing system 100 of FIG. 1, computing device or computing system 1100 of FIG. 11, etc.) or by a component or system (e.g., the neural networks of FIGS. 9 and 10, a chipset, one or more processors central processing units (CPUs), digital signal processors (DSPs), graphics processing units (GPUs), any other type of processor(s), any combination thereof, or other component or system) of the computing device. The operations of the process 800 can be implemented as software components that are executed and run on one or more processors (e.g., processor 1102 of FIG. 11 or other processor(s)) of the computing device. Further, the transmission and reception of signals by the computing device in the process 800 can be enabled, for example, by one or more antennas and/or one or more transceivers (e.g., wireless transceiver(s)).

At block 802, the computing device (or component thereof) can process a QR code, using a machine learning model, to generate an error confidence map including an indication that one or more areas of the QR code are associated with an error. For example, the machine learning model can be a neural network, such as a convolutional neural network (CNN). In such an example, the machine learning model can include the machine learning model 504 of FIG. 5, the machine learning model 604 of FIG. 6, the neural network 900 of FIG. 9, the CNN 1000 of FIG. 10, etc. The error confidence map (e.g., the confidence map of FIG. 5 and FIG. 6). The confidence map can map the QR code to tensors of the machine learning model and receive output tensors representing the error confidence map. The error confidence map can be an erasure map of probabilities associated with whether individual modules or blocks of the QR code include erasures. In further examples, the error confidence map can be a heat map, with hotter colors representing an increased probability that corresponding modules of the QR code includes erasures. In some examples, the QR code can be a reconstruction of an occluded QR code. The reconstructed QR code can be based on application of white areas or black areas over one or more occlusions of the occluded QR code.

In further examples, the computing device (or component thereof) can adjust a size of the QR code to a reference size. In such an example, the machine learning model can generate the error confidence map based on the QR code with the adjusted size. The error confidence map can be based on the reference size; and adjust the error confidence map from the reference size to the size of the QR code. In such an example, the computing device (or component thereof) can select the machine learning model based on a size of the QR code. wherein the indication that the one or more areas of the QR code are associated with the error comprises probabilities that the one or more areas of the QR code are associated with the error. In some examples, the computing device (or component thereof) can use the machine learning model to determine whether the one or more areas of the QR code are associated with the error based on a light intensity variance of the one or more areas being above or below a variance threshold.

At block 804, the computing device (or component thereof) can parse the error confidence map to determine a position of the one or more areas of the QR code associated with the error. In some examples, the computing device can use a confidence map parser, such as the confidence map parser 506 of FIG. 5, to parse the confidence map to identify portions of the confidence map associated with erasures or errors. In some examples, the confidence map parser can truncate a set of blocks with confidence higher than a confidence threshold indicating erasures or errors. In some examples, the one or more areas of the QR code are associated with the error comprises probabilities that the one or more areas of the QR code are associated with the error.

At block 806, the computing device (or component thereof) can apply erasure correction at the position of the one or more areas associated with the error. For example, the computing device can use a correction engine, such as the correction engine 516 of FIG. 5 or correction engine 616 of FIG. 6. The computing device can use various correction techniques to correct the erasures of the QR code. For example, the correction engine can use erasure-based Reed-Solomon techniques to correct the erasures and output a corrected QR code.

FIG. 9 is an illustrative example of a neural network 900 (e.g., a deep-learning neural network) that can be used to implement machine-learning erasure-based QR decoding (e.g., QR code error detection, correction, and decoding). An input layer 902 includes input data. In one illustrative example, input layer 902 can include data representing data associated with a QR code, such as the first QR code 202, the second QR code 204, or the third QR code 206 from FIG. 2. Neural network 900 includes multiple hidden layers, for example, hidden layers 906a, 906b, through 906n. The hidden layers 906a, 906b, through hidden layer 906n include "n" number of hidden layers, where "n" is an integer greater than or equal to one. The number of hidden layers can be made to include as many layers as needed for the given application. Neural network 900 further includes an output layer 904 that provides an output resulting from the processing performed by the hidden layers 906a, 906b, through 906n. In one illustrative example, output layer 904 can generate probabilities associated with whether a portion of a QR code or individual modules of the QR code include an error. In further examples, output layer 904 can predict modules associated with the error to determine possible corrections to the error.

Neural network 900 can be, or can include, a multi-layer neural network of interconnected nodes. Each node can represent a piece of information. Information associated with the nodes is shared among the different layers and each layer retains information as information is processed. In some cases, neural network 900 can include a feed-forward network, in which case there are no feedback connections where outputs of the network are fed back into itself. In some cases, neural network 900 can include a recurrent neural network, which can have loops that allow information to be carried across nodes while reading in input.

Information can be exchanged between nodes through node-to-node interconnections between the various layers. Nodes of input layer 902 can activate a set of nodes in the first hidden layer 906a. For example, as shown, each of the input nodes of input layer 902 is connected to each of the nodes of the first hidden layer 906a. The nodes of first hidden layer 906a can transform the information of each input node by applying activation functions to the input node information. The information derived from the transformation can then be passed to and can activate the nodes of the next hidden layer 906b, which can perform their own designated functions. Example functions include convolutional, up-sampling, data transformation, and/or any other suitable functions. The output of the hidden layer 906b can then activate nodes of the next hidden layer, and so on. The output of the last hidden layer 906n can activate one or more nodes of the output layer 904, at which an output is provided. In some cases, while nodes (e.g., node 908) in neural network 900 are shown as having multiple output lines, a node has a single output and all lines shown as being output from a node represent the same output value.

In some cases, each node or interconnection between nodes can have a weight that is a set of parameters derived from the training of neural network 900. Once neural network 900 is trained, it can be referred to as a trained neural network, which can be used to perform one or more operations. For example, an interconnection between nodes can represent a piece of information learned about the interconnected nodes. The interconnection can have a tunable numeric weight that can be tuned (e.g., based on a training dataset), allowing neural network 900 to be adaptive to inputs and able to learn as more and more data is processed.

Neural network 900 may be pre-trained to process the features from the data in the input layer 902 using the different hidden layers 906a, 906b, through 906n in order to provide the output through the output layer 904. In an example in which neural network 900 is used to identify features in images, neural network 900 can be trained using training data that includes both images and labels, as described above. For instance, training images can be input into the network, with each training image having a label indicating the features in the images (for the feature-segmentation machine-learning system) or a label indicating classes of an activity in each image. In one example using object classification for illustrative purposes, a training image can include an image of a number 2, in which case the label for the image can be [0 0 1 0 0 0 0 0 0 0].

In some cases, neural network 900 can adjust the weights of the nodes using a training process called backpropagation. As noted above, a backpropagation process can include a forward pass, a loss function, a backward pass, and a weight update. The forward pass, loss function, backward pass, and parameter update are performed for one training iteration. The process can be repeated for a certain number of iterations for each set of training images until neural network 900 is trained well enough so that the weights of the layers are accurately tuned.

For the example of identifying objects in images, the forward pass can include passing a training image through neural network 900. The weights are initially randomized before neural network 900 is trained. As an illustrative example, an image can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

As noted above, for a first training iteration for neural network 900, the output will likely include values that do not give preference to any particular class due to the weights being randomly selected at initialization. For example, if the output is a vector with probabilities that the object includes different classes, the probability value for each of the different classes can be equal or at least very similar (e.g., for ten possible classes, each class can have a probability value of 0.1). With the initial weights, neural network 900 is unable to determine low-level features and thus cannot make an accurate determination of what the classification of the object might be. A loss function can be used to analyze error in the output. Any suitable loss function definition can be used, such as a cross-entropy loss. Another example of a loss function includes the mean squared error (MSE), defined as $E_{total} = \Sigma \frac{1}{2}(\text{target}-\text{output})^2$. The loss can be set to be equal to the value of $E_{total}$.

The loss (or error) will be high for the first training images since the actual values will be much different than the predicted output. The goal of training is to minimize the amount of loss so that the predicted output is the same as the training label. Neural network 900 can perform a backward pass by determining which inputs (weights) most contributed to the loss of the network and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w = w_i - \eta \, dL/dW$, where w denotes a weight, $w_i$ denotes the initial weight, and $\eta$ denotes a learning rate. The learning rate can be set to any suitable value, with a high learning rate including larger weight updates and a lower value indicating smaller weight updates.

Neural network 900 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. Neural network 900 can include any other deep network other than a CNN, such as an autoencoder, a deep belief nets (DBNs), a Recurrent Neural Networks (RNNs), among others.

FIG. 10 is an illustrative example of a convolutional neural network (CNN) 1000. The input layer 1002 of the CNN 1000 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1004, an optional non-linear activation layer, a pooling hidden layer 1006, and fully connected layer 1008 (which fully connected layer 1008 can be hidden) to get an output at the output layer 1010. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 can be the convolutional hidden layer 1004. The convolutional hidden layer 1004 can analyze image data of the input layer 1002. Each node of the convolutional hidden layer 1004 is connected to a region of nodes (pixels) of the input image called a receptive field. The convolutional hidden layer 1004 can be considered as one or more filters (each filter corresponding to a different activation or feature map), with each convolutional iteration of a filter being a node or neuron of the convolutional hidden layer 1004. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1004. Each connection between a node and a receptive field for that node learns a weight and, in some cases, an overall bias such that each node learns to analyze its particular local receptive field in the input image. Each node of the convolutional hidden layer 1004 will have the same weights and bias (called a shared weight and a shared bias). For example, the filter has an array of weights (numbers) and the same depth as the input. A filter will have a depth of 3 for an image frame example (according to three color components of the input image). An illustrative example size of the filter array is 5×5×3, corresponding to a size of the receptive field of a node.

The convolutional nature of the convolutional hidden layer 1004 is due to each node of the convolutional layer being applied to its corresponding receptive field. For example, a filter of the convolutional hidden layer 1004 can begin in the top-left corner of the input image array and can convolve around the input image. As noted above, each convolutional iteration of the filter can be considered a node or neuron of the convolutional hidden layer 1004. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1004. For example, a filter can be moved by a step amount (referred to as a stride) to the next receptive field. The stride can be set to 1 or any other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1004.

The mapping from the input layer to the convolutional hidden layer 1004 is referred to as an activation map (or feature map). The activation map includes a value for each node representing the filter results at each location of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1004 can include several activation maps in order to identify multiple features in an image. The example shown in FIG. 10 includes three activation maps. Using three activation maps, the convolutional hidden layer 1004 can detect three different kinds of features, with each feature being detectable across the entire image.

In some examples, a non-linear hidden layer can be applied after the convolutional hidden layer 1004. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1000 without affecting the receptive fields of the convolutional hidden layer 1004.

The pooling hidden layer 1006 can be applied after the convolutional hidden layer 1004 (and after the non-linear hidden layer when used). The pooling hidden layer 1006 is used to simplify the information in the output from the convolutional hidden layer 1004. For example, the pooling hidden layer 1006 can take each activation map output from the convolutional hidden layer 1004 and generates a condensed activation map (or feature map) using a pooling function. Max-pooling is one example of a function performed by a pooling hidden layer. Other forms of pooling functions be used by the pooling hidden layer 1006, such as average pooling, L2-norm pooling, or other suitable pooling functions. A pooling function (e.g., a max-pooling filter, an L2-norm filter, or other suitable pooling filter) is applied to each activation map included in the convolutional hidden layer 1004. In the example shown in FIG. 10, three pooling filters are used for the three activation maps in the convolutional hidden layer 1004.

In some examples, max-pooling can be used by applying a max-pooling filter (e.g., having a size of 2×2) with a stride (e.g., equal to a dimension of the filter, such as a stride of 2) to an activation map output from the convolutional hidden layer 1004. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1004 having a dimension of 24×24 nodes, the output from the pooling hidden layer 1006 will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling) and using the computed values as an output.

The pooling function (e.g., max-pooling, L2-norm pooling, or other pooling function) determines whether a given feature is found anywhere in a region of the image and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1006 to every one of the output nodes in the output layer 1010. Using the example above, the input layer includes 28×28 nodes encoding the pixel intensities of the input image, the convolutional hidden layer 1004 includes 3×24×24 hidden feature nodes based on application of a 5×5 local receptive field (for the filters) to three activation maps, and the pooling hidden layer 1006 includes a layer of 3×12×12 hidden feature nodes based on application of max-pooling filter to 2×2 regions across each of the three feature maps. Extending this example, the output layer 1010 can include ten output nodes. In such an example, every node of the 3×12×12 pooling hidden layer 1006 is connected to every node of the output layer 1010.

The fully connected layer 1008 can obtain the output of the previous pooling hidden layer 1006 (which should represent the activation maps of high-level features) and determines the features that most correlate to a particular class. For example, the fully connected layer 1008 can determine the high-level features that most strongly correlate to a particular class and can include weights (nodes) for the high-level features. A product can be computed between the weights of the fully connected layer 1008 and the pooling hidden layer 1006 to obtain probabilities for the different classes. For example, if the CNN 1000 is being used to predict that an object in an image is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1010 can include an M-dimensional vector (in the prior example, M=10). M indicates the number of classes that the CNN 1000 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some examples, computing system 1100 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, camera, accelerometers, gyroscopes, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.10 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some examples, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1: An apparatus for quick response (QR) code decoding, the apparatus comprising: at least one memory; and at least one processor coupled to the at least one memory and configured to: apply a filter to a QR code to blur the QR code; determine one or more areas of the filtered QR code that are associated with an error based on a light intensity variance of the one or more areas being above or below a variance threshold; and apply erasure correction to the one or more areas.

Aspect 2: The apparatus of Aspect 1, wherein the erasure correction includes erasure-based Reed-Solomon correction.

Aspect 3: The apparatus of any of Aspects 1 to 2, wherein the filter is a Gaussian filter.

Aspect 4: The apparatus of any of Aspects 1 to 3, wherein the QR code is a reconstruction of an occluded QR code, wherein the reconstruction is based on application of white areas or black areas over one or more occlusions of the occluded QR code.

Aspect 5: The apparatus of any of Aspects 1 to 4, wherein the at least one processor is further configured to: determine the one or more areas of the filtered QR code are associated with the error based on the light intensity variance of the one or more areas being above or below the variance threshold using a machine learning model.

Aspect 6: An apparatus for quick response (QR) code decoding, the apparatus comprising: at least one memory; and at least one processor coupled to the at least one memory and configured to: process a QR code, using a machine learning model, to generate an error confidence map including an indication that one or more areas of the QR code are associated with an error; parse the error confidence map to determine a position of the one or more areas of the QR code associated with the error; and apply erasure correction at the position of the one or more areas associated with the error.

Aspect 7: The apparatus of Aspect 6, wherein the erasure correction includes erasure-based Reed-Solomon correction.

Aspect 8: The apparatus of any of Aspects 6 to 7, wherein the at least one processor is further configured to: adjust a size of the QR code to a reference size, wherein the machine learning model generates the error confidence map based on the QR code with the adjusted size and the error confidence map is based on the reference size; and adjust the error confidence map from the reference size to the size of the QR code.

Aspect 9: The apparatus of any of Aspects 6 to 8, wherein the at least one processor is further configured to: select the machine learning model based on a size of the QR code.

Aspect 10: The apparatus of any of Aspects 6 to 9, wherein the machine learning model includes a convolutional neural network (CNN).

Aspect 11: The apparatus of any of Aspects 6 to 10, wherein the indication that the one or more areas of the QR code are associated with the error comprises probabilities that the one or more areas of the QR code are associated with the error.

Aspect 12: The apparatus of any of Aspects 6 to 11, wherein the QR code is a reconstruction of an occluded QR code, wherein the reconstruction is based on application of white areas or black areas over one or more occlusions of the occluded QR code.

Aspect 13: The apparatus of any of Aspects 6 to 12, wherein the at least one processor is further configured to: determine, using the machine learning model, wherein the one or more areas of the QR code are associated with the error based on a light intensity variance of the one or more areas being above or below a variance threshold.

Aspect 14: A method for quick response (QR) code decoding, the method comprising: applying a filter to a QR code to blur the QR code; determining one or more areas of the filtered QR code that are associated with an error based on a light intensity variance of the one or more areas being above or below a variance threshold; and applying erasure correction to the one or more areas.

Aspect 15: The method of Aspect 14, wherein the erasure correction includes erasure-based Reed-Solomon correction.

Aspect 16: The method of any of Aspects 14 to 15, wherein the filter is a Gaussian filter.

Aspect 17: The method of any of Aspects 14 to 16, wherein the QR code is a reconstruction of an occluded QR code, wherein the reconstruction is based on application of white areas or black areas over one or more occlusions of the occluded QR code.

Aspect 18: The method of any of Aspects 14 to 17, comprising: determining the one or more areas of the filtered QR code are associated with the error based on the light intensity variance of the one or more areas being above or below the variance threshold using a machine learning model.

Aspect 19: A method for quick response (QR) code decoding, comprising: processing a QR code, using a machine learning model, to generate an error confidence map including an indication that one or more areas of the QR code are associated with an error; parsing the error confidence map to determine a position of the one or more areas of the QR code associated with the error; and applying erasure correction at the position of the one or more areas associated with the error.

Aspect 20: The method of Aspect 19, wherein the erasure correction includes erasure-based Reed-Solomon correction.

Aspect 21: The method of any of Aspects 19 to 20, the method comprising: adjusting a size of the QR code to a reference size, wherein the machine learning model generates the error confidence map based on the QR code with the adjusted size and the error confidence map is based on the reference size; and adjusting the error confidence map from the reference size to the size of the QR code.

Aspect 22: The method of any of Aspects 19 to 21, further comprising: selecting the machine learning model based on a size of the QR code.

Aspect 23: The method of any of Aspects 19 to 22, wherein the machine learning model includes a convolutional neural network (CNN).

Aspect 24: The method of any of Aspects 19 to 23, wherein the indication that the one or more areas of the QR code are associated with the error comprises probabilities that the one or more areas of the QR code are associated with the error.

Aspect 25: The method of any of Aspects 19 to 24, wherein the QR code is a reconstruction of an occluded QR code, wherein the reconstruction is based on application of white areas or black areas over one or more occlusions of the occluded QR code.

Aspect 26: The method of any of Aspects 19 to 25, further comprising: determining, using the machine learning model, wherein the one or more areas of the QR code are associated with the error based on a light intensity variance of the one or more areas being above or below a variance threshold.

Aspect 27: An apparatus for quick response (QR) code decoding is provided. The apparatus includes one or more means for performing operations according to any of Aspects 14 to 26.

Aspect 28: A non-transitory computer-readable medium is provided having stored thereon instructions that, when executed by at least one processor, cause the at least one processor to perform operations according to any of Aspects 14 to 26.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more."

What is claimed is:

1. An apparatus for quick response (QR) code decoding, the apparatus comprising:
    at least one memory; and
    at least one processor coupled to the at least one memory and configured to:
        apply a filter to a QR code to blur the QR code;
        determine one or more areas of the filtered QR code that are associated with an error based on a light intensity variance of the one or more areas being above or below a variance threshold; and
        apply erasure correction to the one or more areas.

2. The apparatus of claim 1, wherein the erasure correction includes erasure-based Reed-Solomon correction.

3. The apparatus of claim 1, wherein the filter is a Gaussian filter.

4. The apparatus of claim 1, wherein the QR code is a reconstruction of an occluded QR code, wherein the reconstruction is based on application of white areas or black areas over one or more occlusions of the occluded QR code.

5. The apparatus of claim 1, wherein the at least one processor is further configured to:
    determine the one or more areas of the filtered QR code are associated with the error based on the light intensity variance of the one or more areas being above or below the variance threshold using a machine learning model.

6. An apparatus for quick response (QR) code decoding, the apparatus comprising:
    at least one memory; and
    at least one processor coupled to the at least one memory and configured to:
        process a QR code, using a machine learning model, to generate an error confidence map including an indication that one or more areas of the QR code are associated with an error;
        parse the error confidence map to determine a position of the one or more areas of the QR code associated with the error; and
        apply erasure correction at the position of the one or more areas associated with the error.

7. The apparatus of claim 6, wherein the erasure correction includes erasure-based Reed-Solomon correction.

8. The apparatus of claim 6, wherein the at least one processor is further configured to:
    adjust a size of the QR code to a reference size, wherein the machine learning model generates the error confidence map based on the QR code with the adjusted size and the error confidence map is based on the reference size; and
    adjust the error confidence map from the reference size to the size of the QR code.

9. The apparatus of claim 6, wherein the at least one processor is further configured to:
    select the machine learning model based on a size of the QR code.

10. The apparatus of claim 6, wherein the machine learning model includes a convolutional neural network (CNN).

11. The apparatus of claim 6, wherein the indication that the one or more areas of the QR code are associated with the error comprises probabilities that the one or more areas of the QR code are associated with the error.

12. The apparatus of claim 6, wherein the QR code is a reconstruction of an occluded QR code, wherein the reconstruction is based on application of white areas or black areas over one or more occlusions of the occluded QR code.

13. The apparatus of claim 6, wherein the at least one processor is further configured to:
    determine, using the machine learning model, wherein the one or more areas of the QR code are associated with the error based on a light intensity variance of the one or more areas being above or below a variance threshold.

14. A method for quick response (QR) code decoding, the method comprising:
    processing a QR code, using a machine learning model, to generate an error confidence map including an indication that one or more areas of the QR code are associated with an error;
    parsing the error confidence map to determine a position of the one or more areas of the QR code associated with the error; and
    applying erasure correction at the position of the one or more areas associated with the error.

15. The method of claim 14, wherein the erasure correction includes erasure-based Reed-Solomon correction.

16. The method of claim 14, comprising:
    adjusting a size of the QR code to a reference size, wherein the machine learning model generates the error confidence map based on the QR code with the adjusted size and the error confidence map is based on the reference size; and adjusting the error confidence map from the reference size to the size of the QR code.

17. The method of claim 14, comprising:
selecting the machine learning model based on a size of the QR code.

18. The method of claim 14, wherein the machine learning model includes a convolutional neural network (CNN).

19. The method of claim 14, wherein the indication that the one or more areas of the QR code are associated with the error comprises probabilities that the one or more areas of the QR code are associated with the error.

20. The method of claim 14, wherein the QR code is a reconstruction of an occluded QR code, wherein the reconstruction is based on application of white areas or black areas over one or more occlusions of the occluded QR code.

* * * * *